No. 740,802. Patented October 6, 1903.

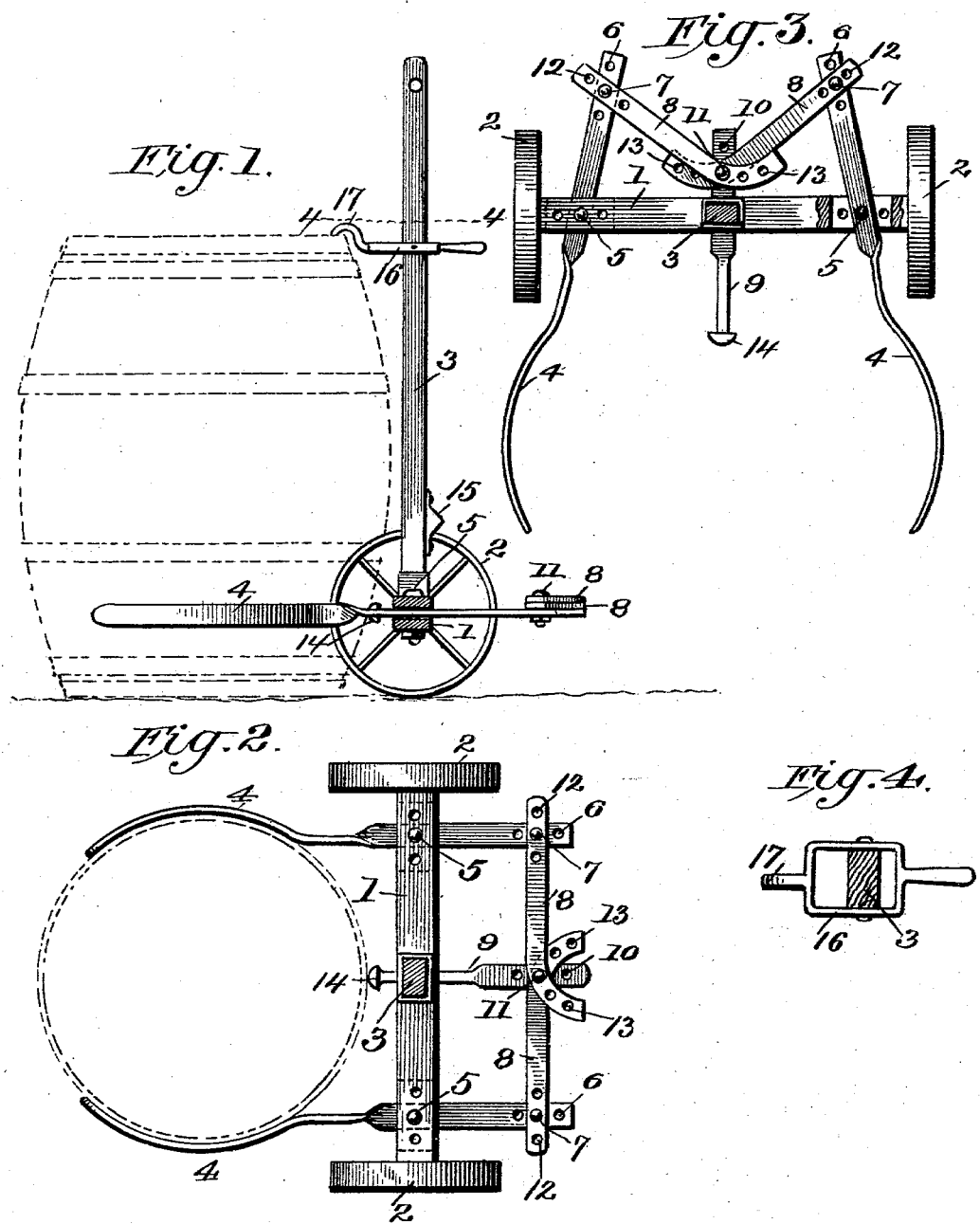

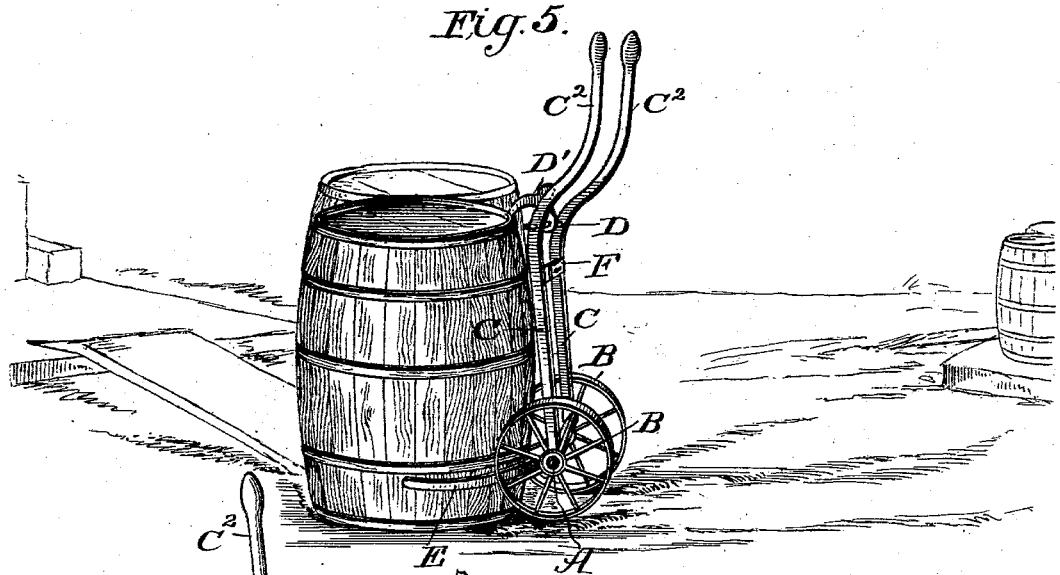
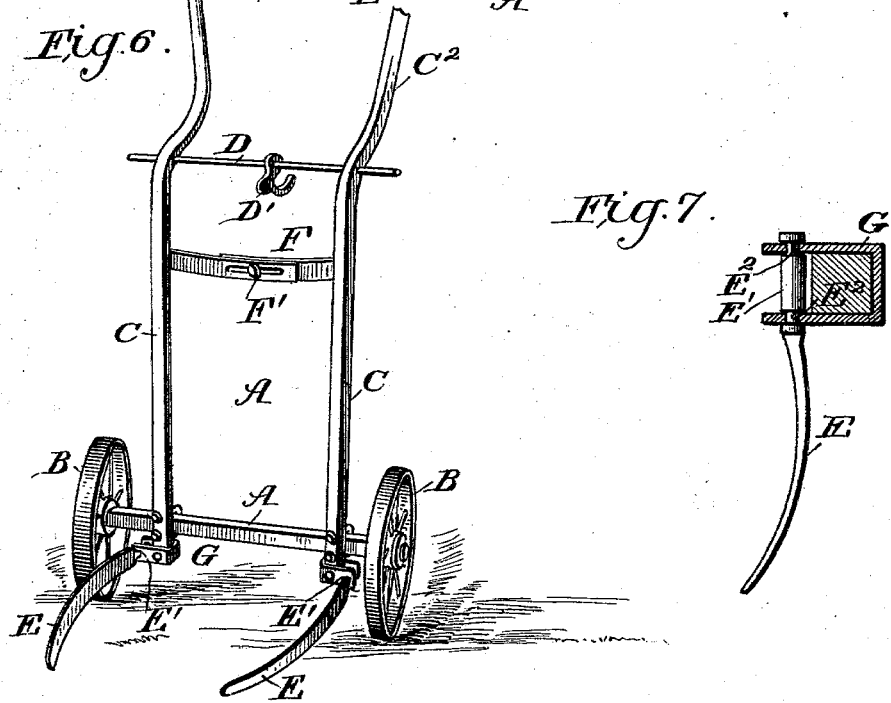
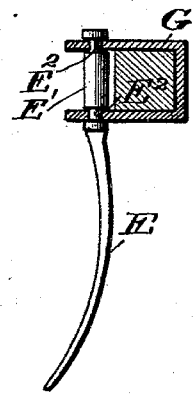

UNITED STATES PATENT OFFICE.

THOMAS HAYES BROWN, OF STERLING, KANSAS.

TRUCK.

SPECIFICATION forming part of Letters Patent No. 740,802, dated October 6, 1903.

Application filed March 4, 1903. Serial No. 146,076. (No model.)

*To all whom it may concern:*

Be it known that I, THOMAS HAYES BROWN, a citizen of the United States, residing at Sterling, in the county of Rice and State of Kansas, have made certain new and useful Improvements in Trucks, of which the following is a specification.

My invention is an improvement in trucks, and particularly in hand-trucks such as are used in warehouses and the like; and the invention consists in certain novel constructions and combinations of parts, as will be hereinafter described and claimed, whereby to facilitate the handling of heavy barrels by the truck.

In the drawings, Figure 1 is a side elevation of the truck as in use. Fig. 2 is a sectional top plan view thereof as in use. Fig. 3 is a detail sectional top plan view of the truck, and Fig. 4 is a detail sectional view on about line 4 4 of Fig. 1. Fig. 5 is a perspective view of a truck as in use, such truck differing somewhat from that shown in Figs. 1 to 4. Fig. 6 is a perspective view of the truck shown in Fig. 5; and Fig. 7 is a detail view illustrating, on an enlarged scale, the connections between the clasp-arms and the bars of the truck in the construction shown in Figs. 5 and 6.

It will be noticed that the construction shown in Figs. 1 to 4, inclusive, differs somewhat in details of construction from that shown in Figs. 5 to 7, inclusive; but it will be understood from the following description that both constructions are within the broad principles of my invention, as will be herein presented.

In the construction shown in Figs. 1 to 4, inclusive, the truck includes a suitable frame having an axle or shaft 1, provided with wheels 2, and a handle-bar 3, secured to the axle at the center of the latter, as shown in Figs. 2 and 3. The clasps 4 are pivoted between their ends at 5 to the axle, so they may rock laterally, and their front ends or arms are curved to conform to and embrace a barrel, and their rear ends, which extend to the rear of the axle, are provided with a series of holes 6 for the pivoted bolts 7, by which the rear ends of the clasps are connected with the links 8, which connect such ends with the plunger 9, the plunger 9 having a series of holes 10 for the bolt 11 and the links 8 having series of holes 12 and 13 for, respectively, the bolts 7 and 11, so the clasps can be operated by properly adjusting the bolts 7 and 11 to suit barrels or sacks of different sizes.

The plunger 9 is slidable longitudinally through the frame and preferably through the axle, as shown, and is arranged at its front end 14 to engage the barrel, so the barrel will push the plunger back from the position shown in Fig. 3 to that shown in Fig. 2, and thus cause the clasps to contract upon the barrel to secure the latter, as shown in Figs. 1 and 2. The handle 3 has a step 15, upon which the operator may press with his foot, and also is provided with a latch 16, having a hook 17 to engage the upper end of the barrel, as will be understood from Fig. 1 of the drawings.

In operation if the parts be as shown in Fig. 3 and the truck be rolled against a barrel to the position shown in Fig. 1 the plunger 9 will be forced rearwardly and will operate through its connections 8 with the rear ends of the clasps to compress the clasps upon the barrel and hold the same as desired. The foot may now be placed on step 15 and the handle be pulled down to an angle of about forty degrees. The weight will now be balanced on the center of the axle and can be readily moved to any desired point. The truck can be pushed close to a barrel and can pick out a barrel from between others, and the rear end of the plunger and the links connected therewith, when arranged as shown in Fig. 2, will form a rest for the foot, which also aids in lifting the barrel.

The truck, as shown in Figs. 5 to 7, inclusive, includes the axle A, having the wheels B; the bars C, which may slide longitudinally the handles $C^2$; the latch-bar D, supporting the along the axle A and are extended to form latch D', and the clasps E, together with an adjustable connection between the bars C and consisting of the cross-bars F, adjustably connected at F', so the truck may be spread laterally to adapt it for barrels of different sizes. The clasp consists of the arms E, which are jointed at their inner ends to the frame of the truck, preferably to the lower ends of the bars C, so the clasp-bars E may turn on their connection with the arms in adjusting or rolling into a proper engagement with the barrel. To this end I provide clips G on the bars C, within which the shanks E' of the clasp-bars E are journaled, the said shanks being grooved at E² to receive the clips and hold the clasp-arms from longitudinal movement.

In operation the action of the clasp-arms is quite similar to that of the human hand and arm, the lower portion of the clasp touching the barrel first, when by pulling down the handles C' the clasp will be caused to roll so its upper portion or edge will engage the barrel and hold it firmly. It will be undestood that, as shown, the clasp-arms E are curved to properly conform to the curvature of the barrel.

By my invention a barrel of heavy goods, such as salt or sugar, can be picked up with ease and placed on the desired spot without touching it with the hands either in loading or unloading. It will be noticed the clasp-arms work automatically and extend in front of the wheels, so that the truck being pushed in front of the barrel the arms roll and adjust themselves to the barrel below the quarter-hoop, it making no difference whether the barrel stands alone or is an intermediate one of three or more. The wheels being back, the clasps readily pass between the adjacent barrels to position to engage with the quarter-hoops, as will be understood from Figs. 1 and 5. At this time, the handle being in a perpendicular position, the hook or latch will catch the top of the barrel, when by pulling down on the handles the arms or clasps will tighten around the barrel and the hook will pull the barrel onto the truck. When the handles are brought down to an angle of about forty degrees, the barrel will balance directly on the center of the axle and the top hoop will drop off of its own weight from engagement with the top of the barrel.

While the clasps may preferably be curved, as shown, to conform to the shape of a barrel, it is manifest they may be made straight wherever desired—as, for instance, when they are especially intended for use in taking up bags.

Having thus described my invention, what I claim as new, and desire to secure by Letters Patent, is—

1. The improved truck herein described, comprising the axle, the handle connected therewith, the clasps pivoted between their ends to the axle and having their front ends or arms curved to embrace a barrel and their rear ends or arms projecting in rear of the axle, the links connected adjustably at their outer ends with the rear ends of the clasps, the plunger slidable longitudinally through the axle from front to rear and arranged at its front end for engagement with the barrel, and devices connecting the rear end of the plunger adjustably with the inner ends of the links whereby the plunger is connected with the rear ends of the clasps, substantially as set forth.

2. A truck comprising a frame, the clasps pivoted to the frame and arranged to embrace a barrel, a plunger movable relatively to the frame and arranged for engagement and operation by the barrel, and means whereby the plunger may operate the clasps, substantially as set forth.

3. The combination in a truck with the frame having a handle and an axle, of clasps pivoted to the frame, a sliding plunger, and means whereby the plunger may operate the clasp.

4. A truck comprising the handle, the axle secured to the handle, the clasps pivoted between their ends to the axle and arranged at approximately a right angle to the handle and adapted in advance of the axle to embrace a barrel, the plunger operating through the axle at approximately a right angle to the handle, and devices connecting the rear ends of the clasps and plunger.

5. The improved truck herein described, comprising the axle, the side bars adjustable along the axle, the adjustable connection between the side bars, the hook or latch for engaging the upper end of the barrel, and the clasp consisting of the opposite arms curved to conform to the curvature of a barrel and provided at their inner ends with shanks, and clips secured to the side bars of the truck and having bearings in which the shanks of the clasp-arms are journaled, substantially as and for the purpose set forth.

THOMAS HAYES BROWN.

Witnesses:
G. J. BROWN,
THOMAS ATKINSON.